(12) United States Patent
Halfon et al.

(10) Patent No.: US 7,874,338 B2
(45) Date of Patent: Jan. 25, 2011

(54) SYSTEM FOR A MULTIPLE TRACK PROFILE WRAPPING MACHINE

(75) Inventors: Amos Halfon, Sitria (IL); Mordechai Harari, Rishon Lezion (IL)

(73) Assignee: Hardoor Mechanism Production Ltd., Rishon Lezion (IL)

(*) Notice: Subject to any disclaimer, the term of this patent is extended or adjusted under 35 U.S.C. 154(b) by 843 days.

(21) Appl. No.: 11/573,049

(22) PCT Filed: Aug. 14, 2005

(86) PCT No.: PCT/IL2005/000877
§ 371 (c)(1),
(2), (4) Date: Feb. 1, 2007

(87) PCT Pub. No.: WO2006/016373
PCT Pub. Date: Feb. 16, 2006

(65) Prior Publication Data
US 2008/0000586 A1    Jan. 3, 2008

Related U.S. Application Data

(60) Provisional application No. 60/601,115, filed on Aug. 13, 2004.

(51) Int. Cl.
*B29C 63/04* (2006.01)

(52) U.S. Cl. .................................. 156/468; 156/475
(58) Field of Classification Search .................. None
See application file for complete search history.

(56) References Cited

U.S. PATENT DOCUMENTS

| | | | | |
|---|---|---|---|---|
| 2,102,237 A * | 12/1937 | Kinnear | ............... | 43/22 |
| 3,676,270 A * | 7/1972 | Lehmacher et al. | ......... | 156/553 |
| 3,945,634 A | 3/1976 | Calvert | | |
| 4,305,775 A | 12/1981 | Kuper | | |
| 5,584,141 A * | 12/1996 | Johnson | ............... | 47/65 |
| 5,932,062 A | 8/1999 | Manser | | |
| 6,210,512 B1 * | 4/2001 | Jones | ............... | 156/220 |
| 6,782,933 B2 * | 8/2004 | Marschke | ............... | 156/472 |

* cited by examiner

*Primary Examiner*—Richard Crispino
*Assistant Examiner*—Barbara J. Musser
(74) *Attorney, Agent, or Firm*—Martin Fleit; Paul D. Bianco; Fleit Gibbons Gutman Bongini & Bianco PL (57) ABSTRACT

Presented herein is a simple, innovative profile wrapping solution that increases the efficiency of single profile wrapping machines and drastically reduces set up time, by enabling the machine operator to set up a plurality of distinct profile tracks, wherein the set up procedure is facilitated by allowing the cylinder to rotate 90 degree to reposition the profile tracks perpendicularly in front of the operator, allowing easy access to the adjustment pins.

6 Claims, 13 Drawing Sheets

SYSTEM FOR A MULTIPLE TRACK PROFILE WRAPPING MACHINE

BACKGROUND

The present invention relates to the field of profile wrapping machines.

In the field of profile wrapping machines, there are several variations of machines that operate according to similar principles: the profile is fed into the machine that applies an adhesive substance and attaches the wrapping material to the profile. Although these state of the art machines are highly efficient, operating them demands a highly complex and time consuming preparation process to be set up for different types of profiles. The set up process, which includes adjusting a large number of profile holders along the track of the profile wrapping machine, might take up to 90 percent of the operational time in small to medium size businesses that own a small number of machines.

Large-scale businesses overcome this problem by acquiring a large number of machines and devoting each machine to a commonly used type of profile. This solution sharply decreases the number of times a profile wrapping machine needs to be adjusted, but since these are expansive and massive machines, it is a costly solution which also demands extensive work floor space.

Addressing this shortcoming the DUP-P Profile Wrapper manufactured by Delle Vedove Inc. was developed, which includes replaceable cartridges. This machine provides only a partial solution to the problem since it demands separately purchasing additional cartridges. These cartridges increase the overall cost of the machine and require significant storage area for a single machine. Further more, this solution does not decrease the setup time required for adjusting the profile holders at the starting and ending points of the machine track.

There is, therefore, a need for a profile wrapping machine that provides an economic solution for drastically reducing the set up time of the machine.

SUMMARY OF INVENTION

The invention presented herein is an innovative system that increases the efficiency of a single profile wrapping machine and drastically reduces set up time, which further is highly economical, both in the overall cost of the machine and in the operational and storing space it requires.

One embodiment of the invention, a single, two-sided, rotating profile wrapping machine, operates with a single glue delivery device and a central cylinder connected to the machine frame via an axis. On each side of the cylinder, there is a fully operative profile track. A single driving means, located inside the cylinder, may be used to operate the wheels on both tracks. The glue delivery is be set up and adjusted for each profile track individually.

A second embodiment, a double, two-sided, rotating profile wrapping machine, includes two central cylinders, each connected to the machine frame via a central axis. On both sides of each of central cylinder, there is a fully operative profile track. Underneath each of the profile tracks, there is a second profile track. Each central axis allows the corresponding cylinders to rotate. Once a 180-degree rotation is completed, the profile tracks that were underneath are now on top, and are ready to be used.

A third embodiment, a multiple, two-sided, rotating profile wrapping machine, allows two profiles to be fed into the machine and through two separate glue delivery device simultaneously, wherein at least two cylinders are mounted on arms projecting for a central axis, which is connected to the machine frame. On each side of each cylinder, there are at least two fully operative profile tracks. When the center axis rotates the arms, the cylinders also rotate. Furthermore, each cylinder is able to rotate independently, facilitating access to each of the tracks.

The main objective of each embodiment is to enable the profile wrapping machine operator to set up a plurality of distinct profile tracks. This solution also facilitates the set up procedure since performing a 90-degree rotation of the cylinder places the track in a perpendicular position in front of the machine operator, and allow easy access to the adjustment pins.

The glue delivery device may be rotated 90 degrees away from the machine in order to facilitate the rotation of the cylinders.

The glue delivery device may further be positioned on the bridge. The glue delivery device should then be set up and adjusted to operate with each operating track. This solution further ensures that the glue delivery device remains out of the way when the cylinders are rotated by placing glue delivery device above the cylinders.

BRIEF DESCRIPTION OF THE DRAWINGS

These and further features and advantages of the invention will become more clearly understood in light of the ensuing description of a preferred embodiment thereof, given by way of example only, with reference to the accompanying drawings, wherein—

DETAILED DESCRIPTION OF THE PREFERRED EMBODIMENTS

The present invention is a simple and innovative solution that allows multiplying the efficiency of a single profile wrapping machine and drastically reducing its set up time. Since this solution is highly economical, both in the overall cost of the machine and in the operational and storing space it requires, it is well suited for small to medium size businesses, while it may also increase the productivity of big scale operations.

Figure 1:
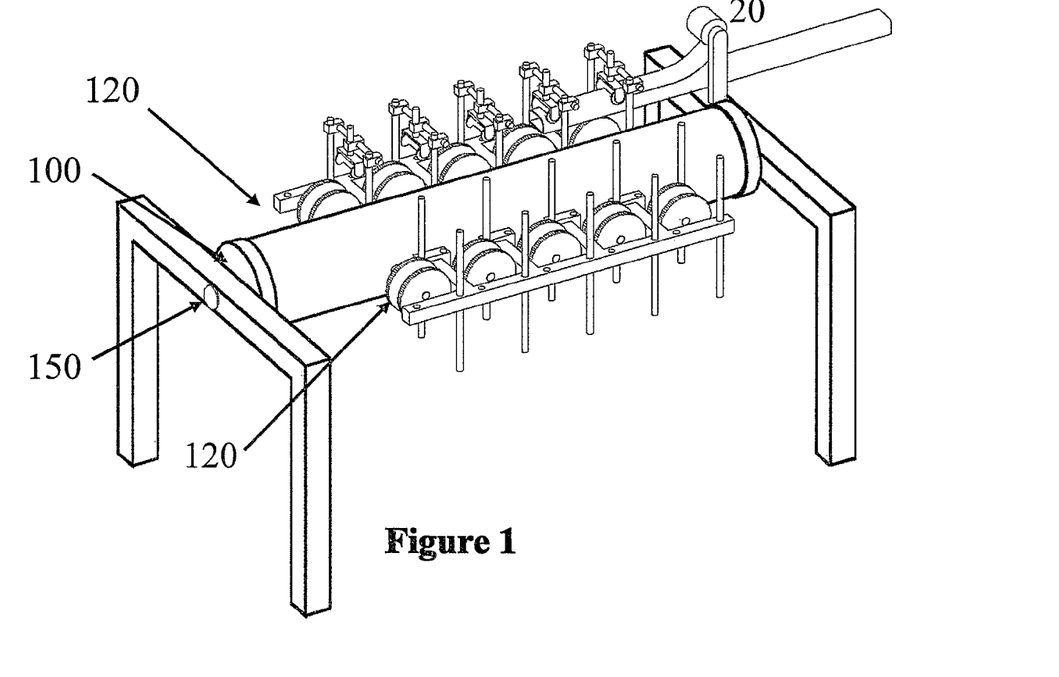
FIG. 1 is an illustration of the first embodiment of the present invention.
Figure 1A:
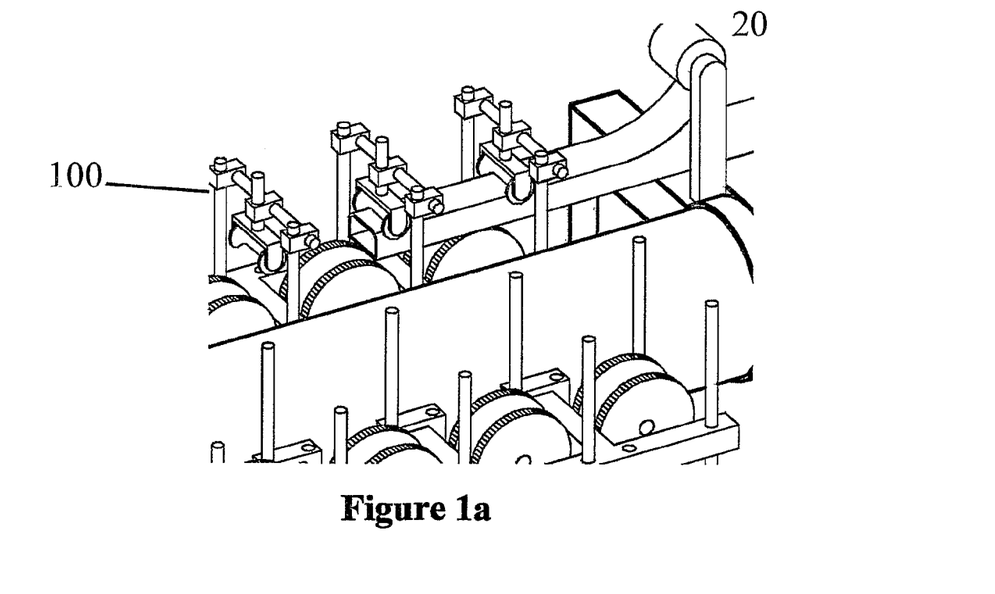
FIG. 1a is detailed illustration of the same.
Figure 2A:
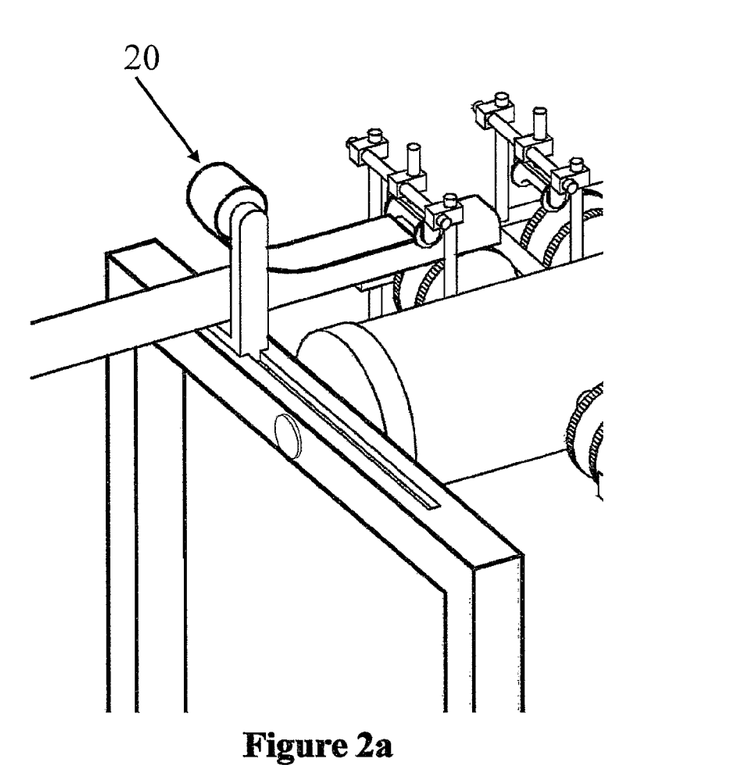
FIG. 2a and FIG. 2b illustrate one possible solution for operating a single glue delivery device on two profile tracks.
Figure 2B:
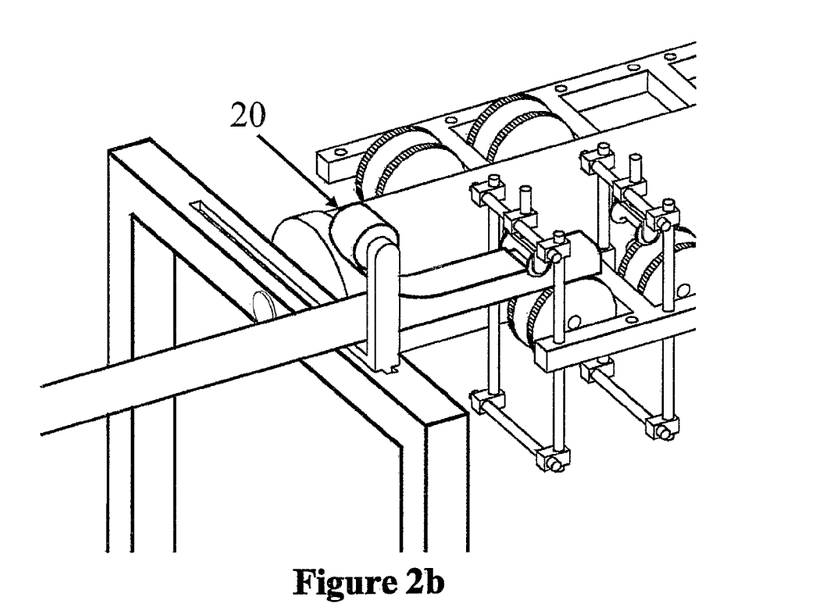

The first embodiment of the invention, which is illustrated in FIG. 1 and FIG. 1a, is a single, two-sided, rotating profile wrapping machine. Each machine operates with a single glue delivery device 20 and a central cylinder 100 that is connected to the machine frame via an axis 150. On each side of cylinder 100, there is a fully operative profile track 120, 121. FIG. 2a and FIG. 2b illustrate one possible solution for enabling the glue delivery device 20 to operate on the two tracks 120, 121 on both sides of cylinder 100. Another solution is illustrated in FIG. 4 to FIG. 7 and is described below. In order to allow the glue delivery device 20 to operate, it must be set up and adjusted for each profile track individually.

Figure 3:
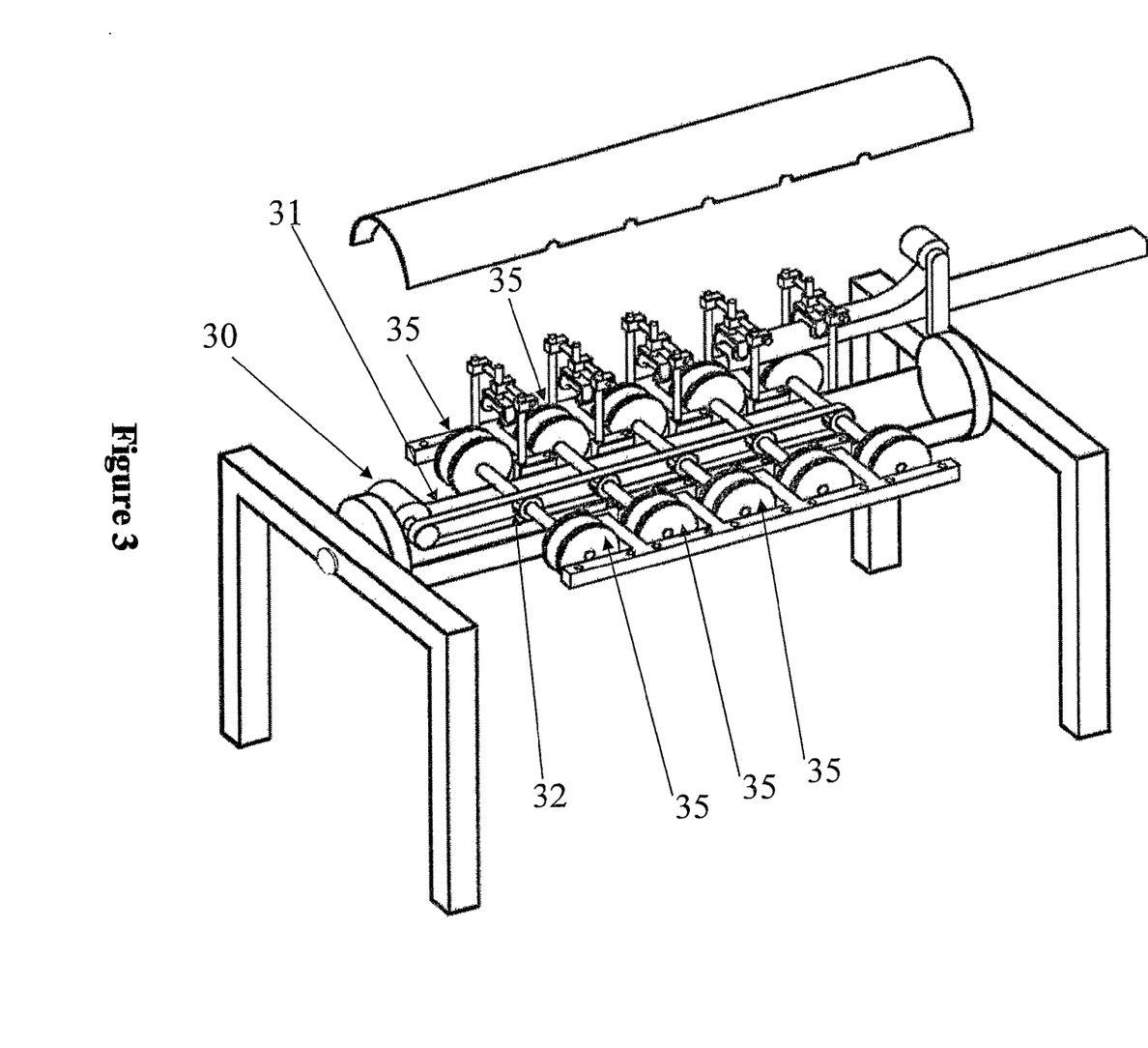
FIG. 3 is an illustration of the mechanism inside the cylinder.
Figure 3A:
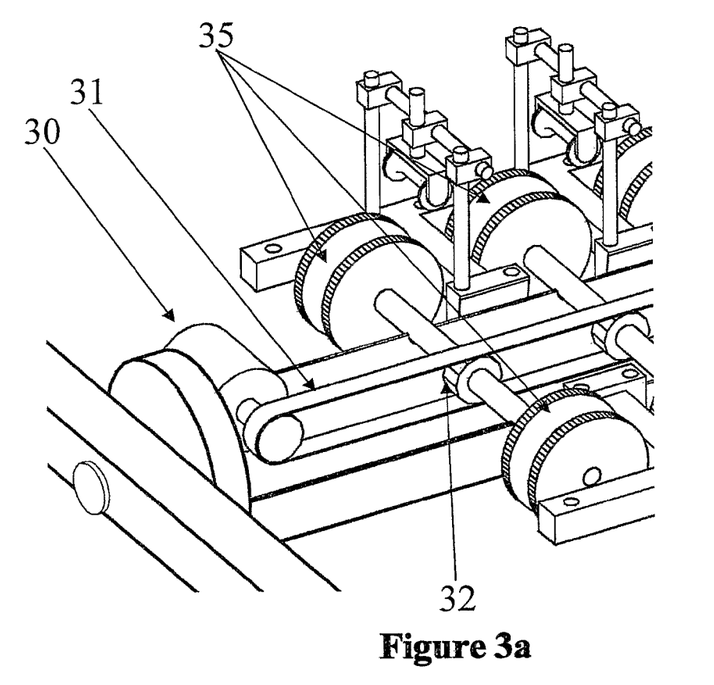
FIG. 3a is a detailed illustration of the driving mechanism.
Figure 3B:
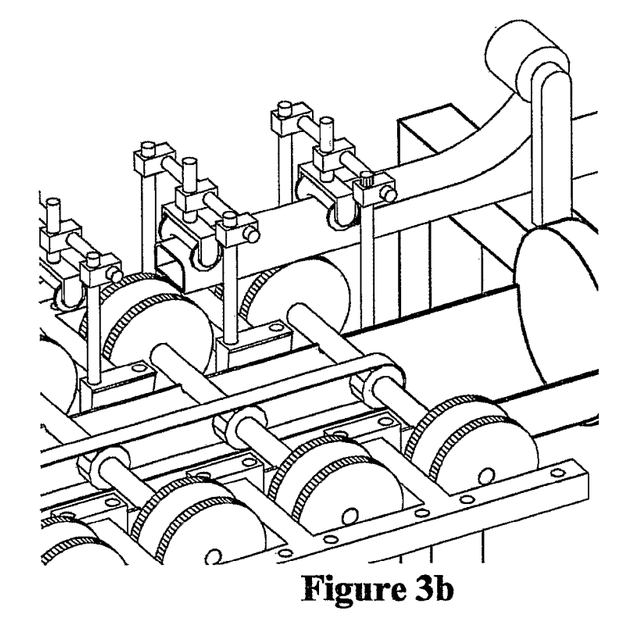
FIG. 3b is a detailed illustration of the mechanism inside the cylinder at the glue delivery end of the tracks.

FIG. 3, FIG. 3a, and FIG. 3b illustrate the driving mechanism that is inside the cylinder. A single driving device 30 may be used to operate the wheels 35 on both tracks. Driving means 30 operates strip 31; strip 31 then operates the cogwheels 32 of each pair of track wheels 35.

Figure 4:
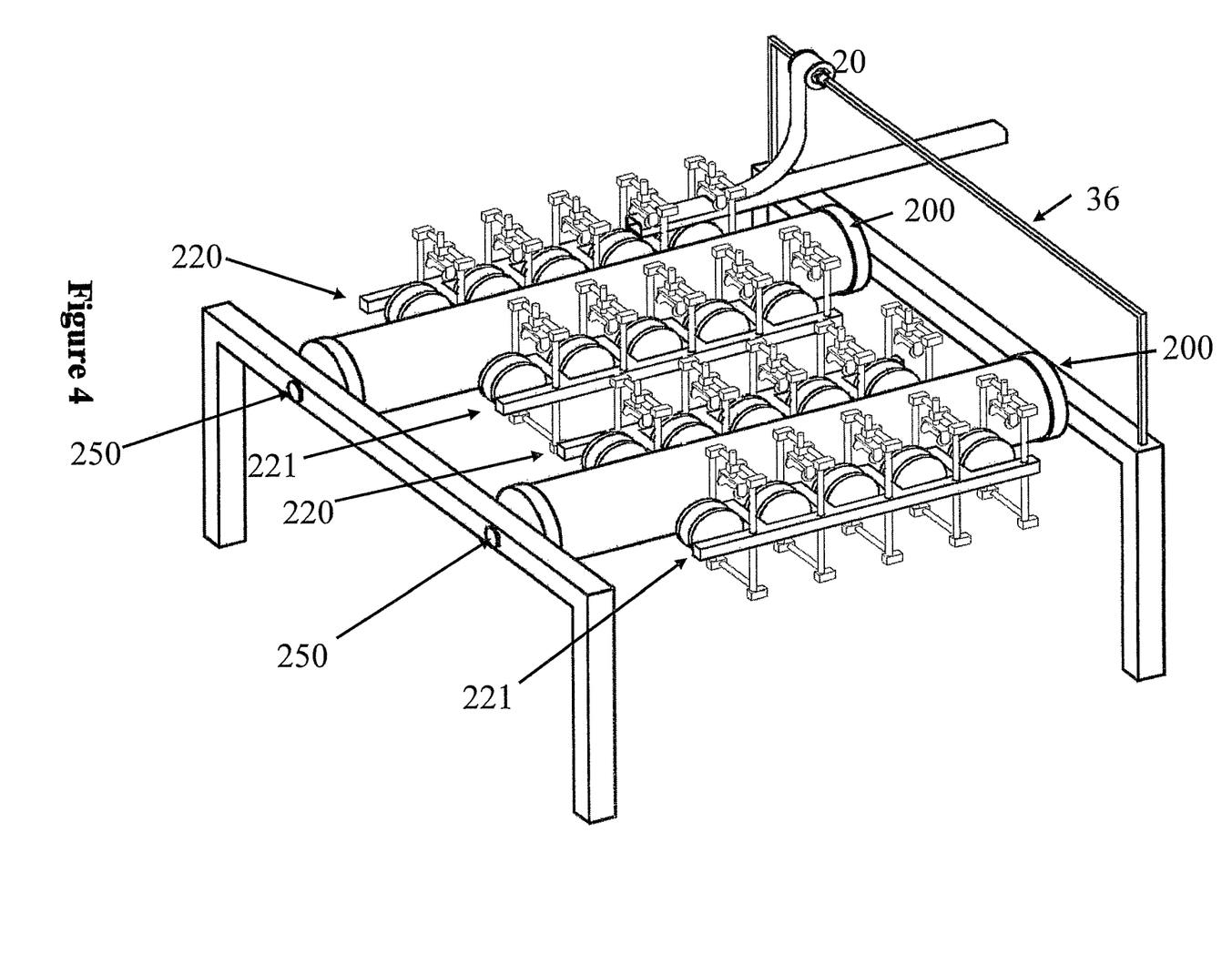
FIG. 4 is an illustration of the second embodiment.
Figure 5:
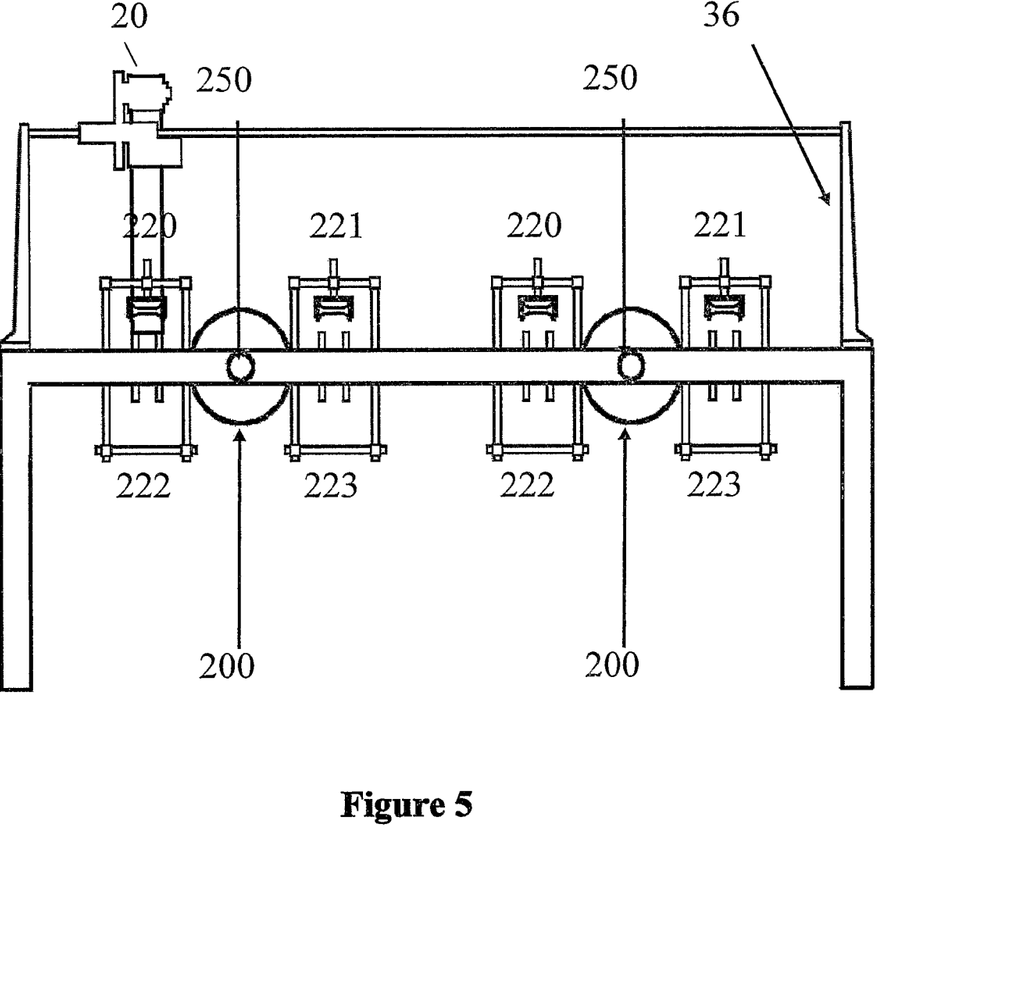
FIG. 5 is a front view of the profile wrapping machine according to the second embodiment of the present invention.
Figure 6:
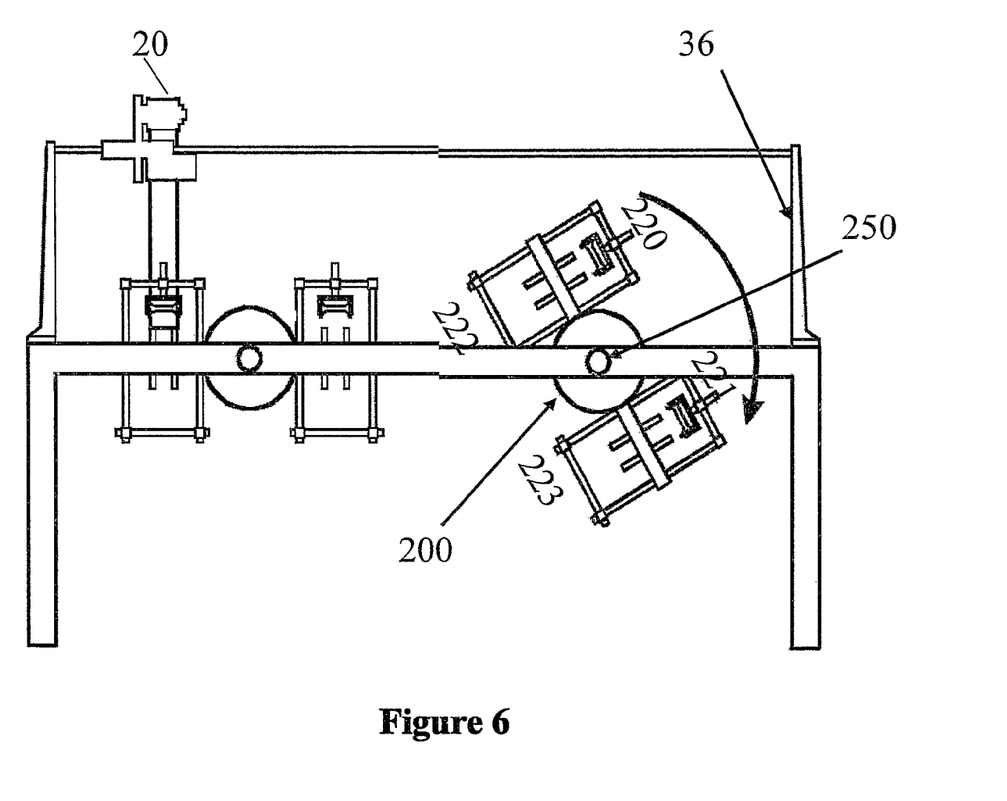
FIG. 6 is an illustration of the same during the rotation of the right hand cylinder.
Figure 7:
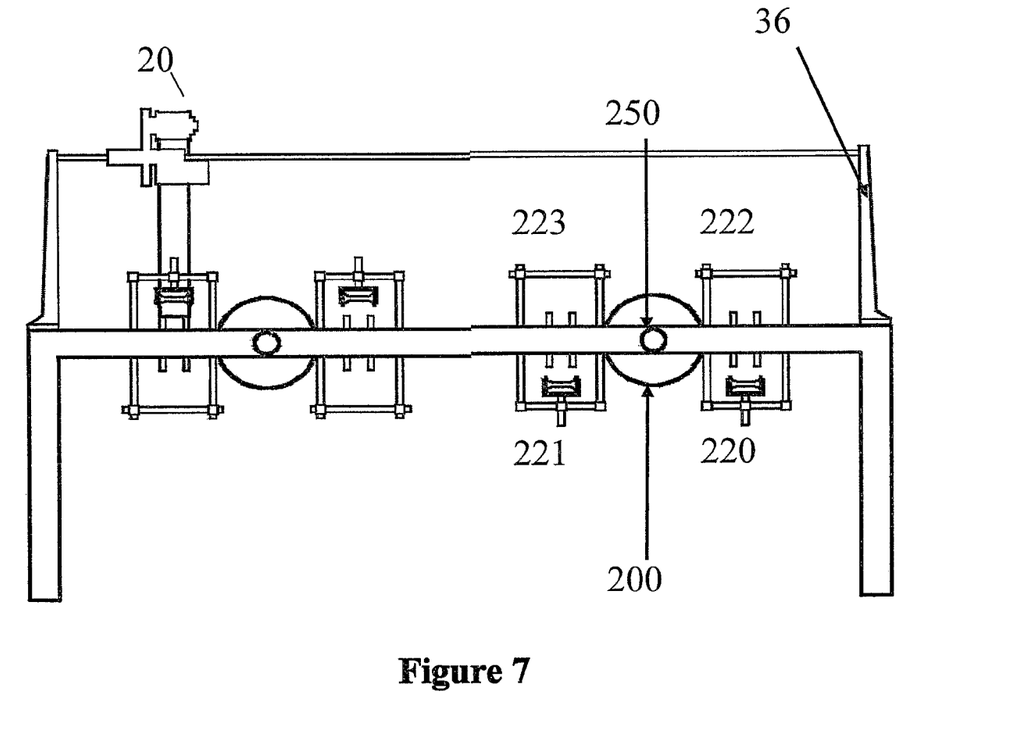
FIG. 7 is an illustration of the second embodiment after the cylinder rotation is complete.

The second embodiment, which is a double, two-sided, rotating profile wrapping machine, is illustrated in FIG. 4. It includes two central cylinders 200, each connected to the machine frame via a central axis 250 wherein on both sides of each of central cylinders 200, there is a fully operative profile track 220, 221. FIG. 5 is a front view of the second embodiment. It clearly illustrates that underneath each of the profile tracks 220, 221 there is a second profile track 222, 223 respectively. As illustrated FIG. 6, cylinders 200 may rotate on their axis 250. This rotation, which, for clarity purposes, is illustrated only on the right hand side cylinder 200, may be performed with each of the cylinders 200. Once a 180-degree rotation is completed, profile tracks 222, 223, which were underneath, are now on top, and are ready to be used as shown in FIG. 7.

Figure 8:
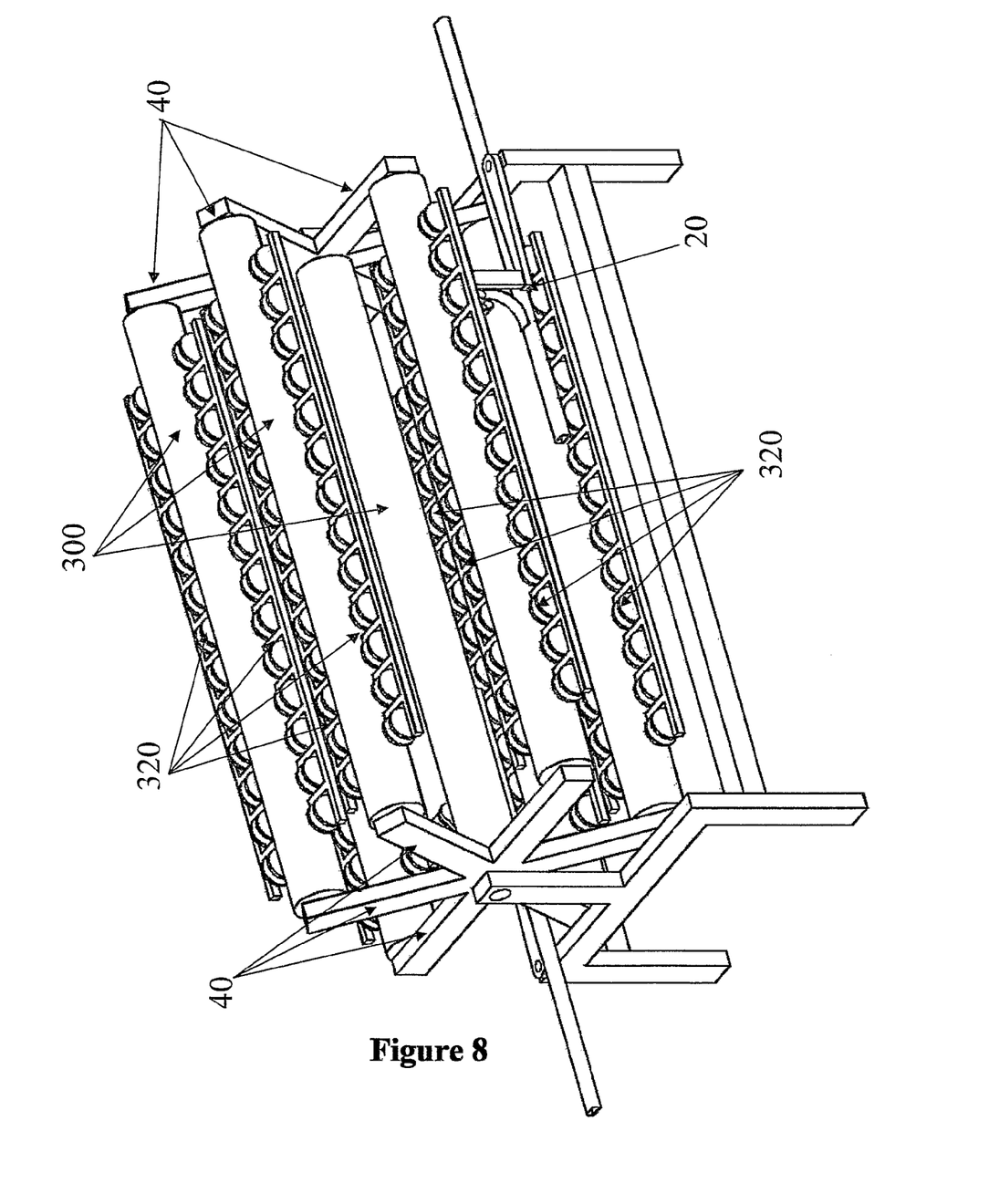
FIG. 8 is a perspective view of the profile wrapping machine according to the third embodiment of the present invention.
Figure 9:
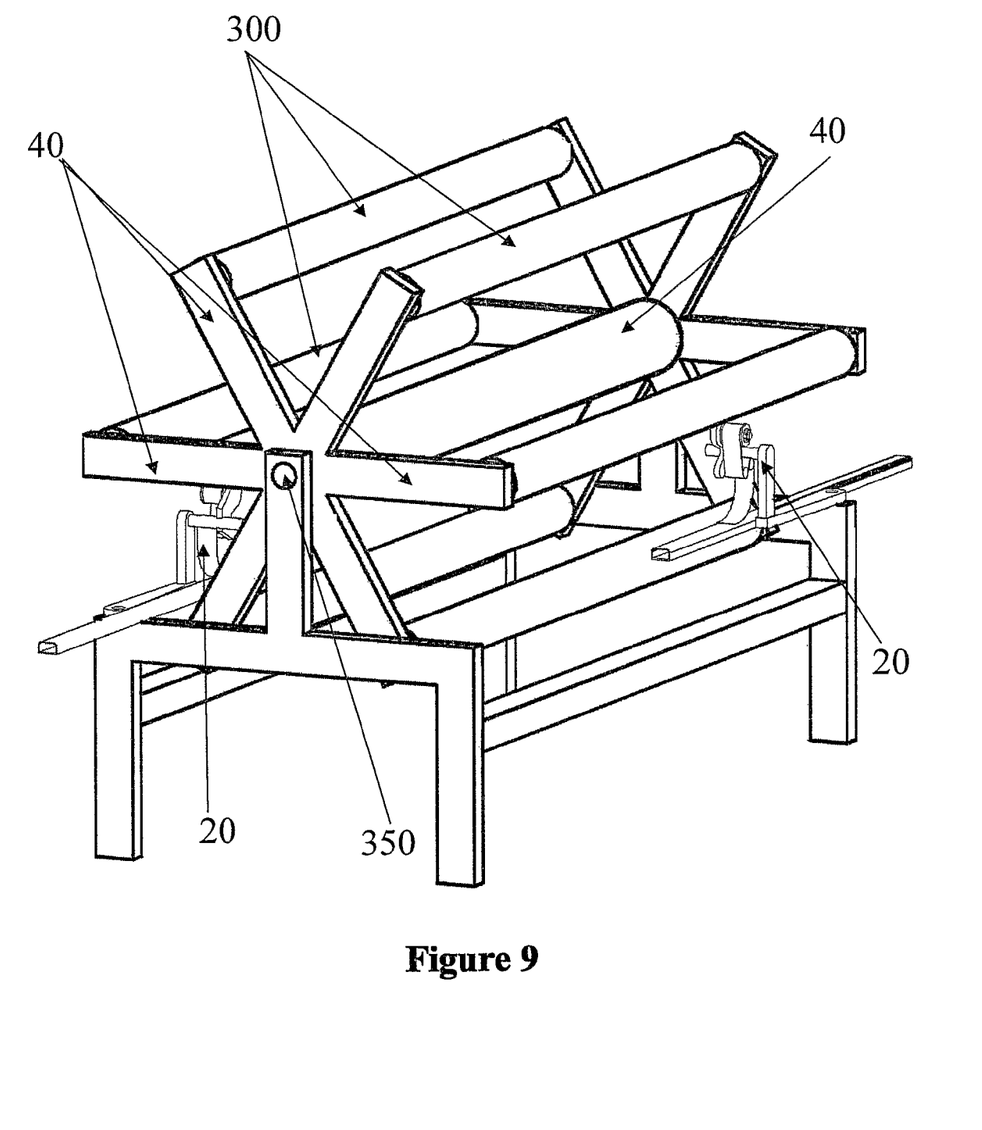
FIG. 9 is a perspective view of the third embodiment of the present invention, detailing the configuration of the cylinders.

A third embodiment, a multiple, two-sided, rotating profile wrapping machine, is shown in FIG. 8 and FIG. 9. This embodiment allows two profiles to be fed into the machine simultaneously. It includes at least six cylinders 300, each end of which is connected to one end of an individual arm 40. The second end of each arm 40 meets at the center of a common hub, which connects to the machine frame via a central axis 350. On each side of each cylinder 300, there are at least two fully operative profile tracks 320. FIG. 8 clearly illustrates the configuration of cylinders 300 mounted on arms 40. Also seen in FIG. 8 are two profiles on separate tracks 320 and 321, one profile on each side of the machine frame, which are being fed into the machine and through two separate glue delivery device 20 simultaneously. Arms 40 are rotated by central driving mechanism 45, seen in FIG. 9. FIG. 9 also shows a simplified view of the third embodiment of the present invention, clearly detailing the configuration of cylinders 300.

This embodiment affords the option several additional time saving advantages. One advantage is that the machine operator is to set up a plurality of tracks 320 at the same time. Another advantage is that, because of the large number of available tracks 320, some of tracks 320 can be pre-set to accommodate standard profile configurations, while others can be used for unique profiles.

In alternative configurations of this embodiment, there may be more than six cylinders 300 or fewer than six cylinders 300. Additionally, there may be more than two tracks 320 per cylinder 300, according to the size of cylinders 300 and central driving mechanism 45 as well as available space.

Figure 10A:
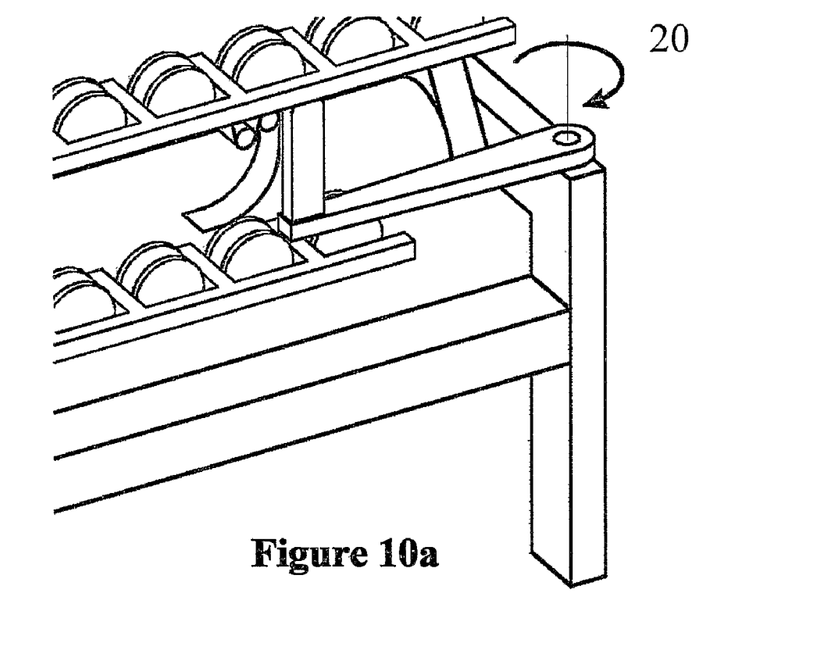
FIG. 10a is detailed illustration of the glue delivery positioned over a profile track.
Figure 10B:
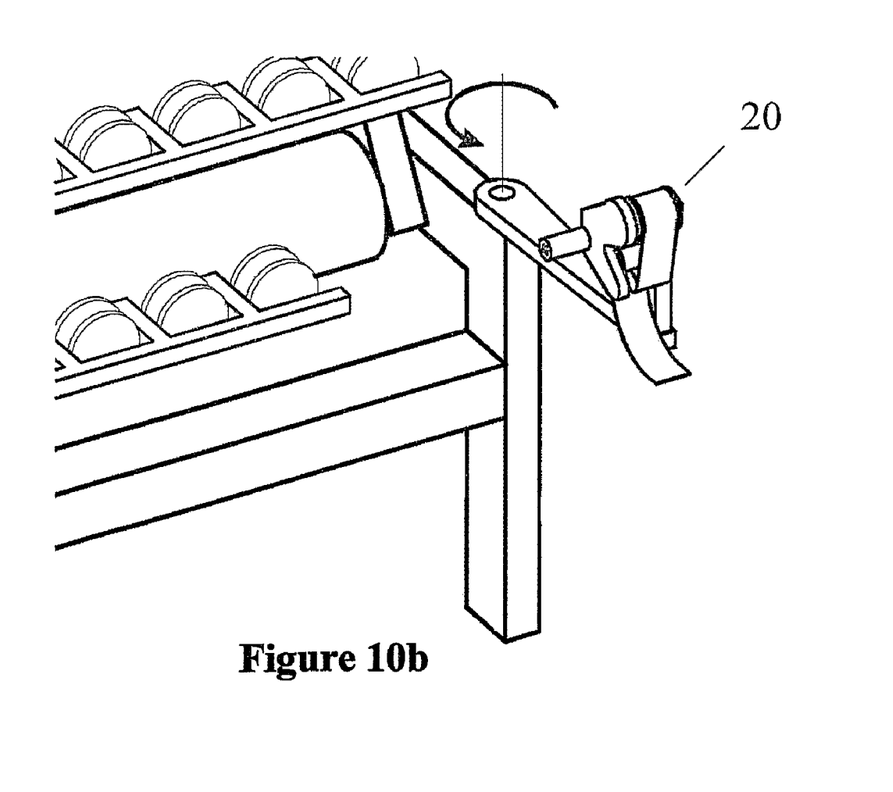
FIG. 10b is detailed illustration of the glue delivery rotated 90 degrees away from the machine.

FIG. 10a and FIG. 10b show detailed views of a glue delivery device 20. In FIG. 10a, glue delivery device 20 is in position over track 320, in order to deliver glue to a profile. In FIG. 10b, glue delivery device 20 has been rotated 90 degrees away from the frame of the machine, in order to facilitate the rotation of arms 40.

Figure 11:
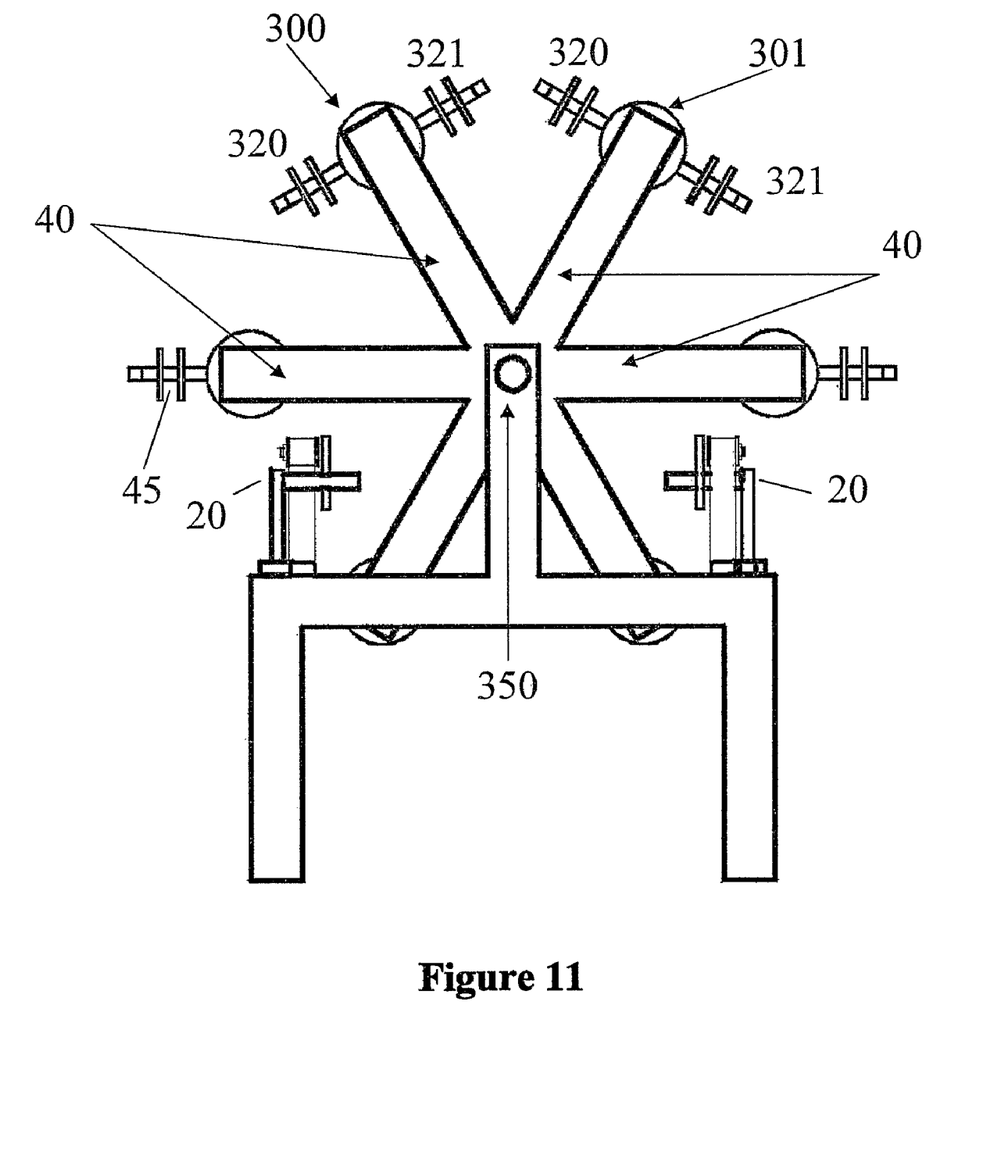
FIG. 11 is an end view of the third embodiment during the cylinder rotation.
Figure 12:
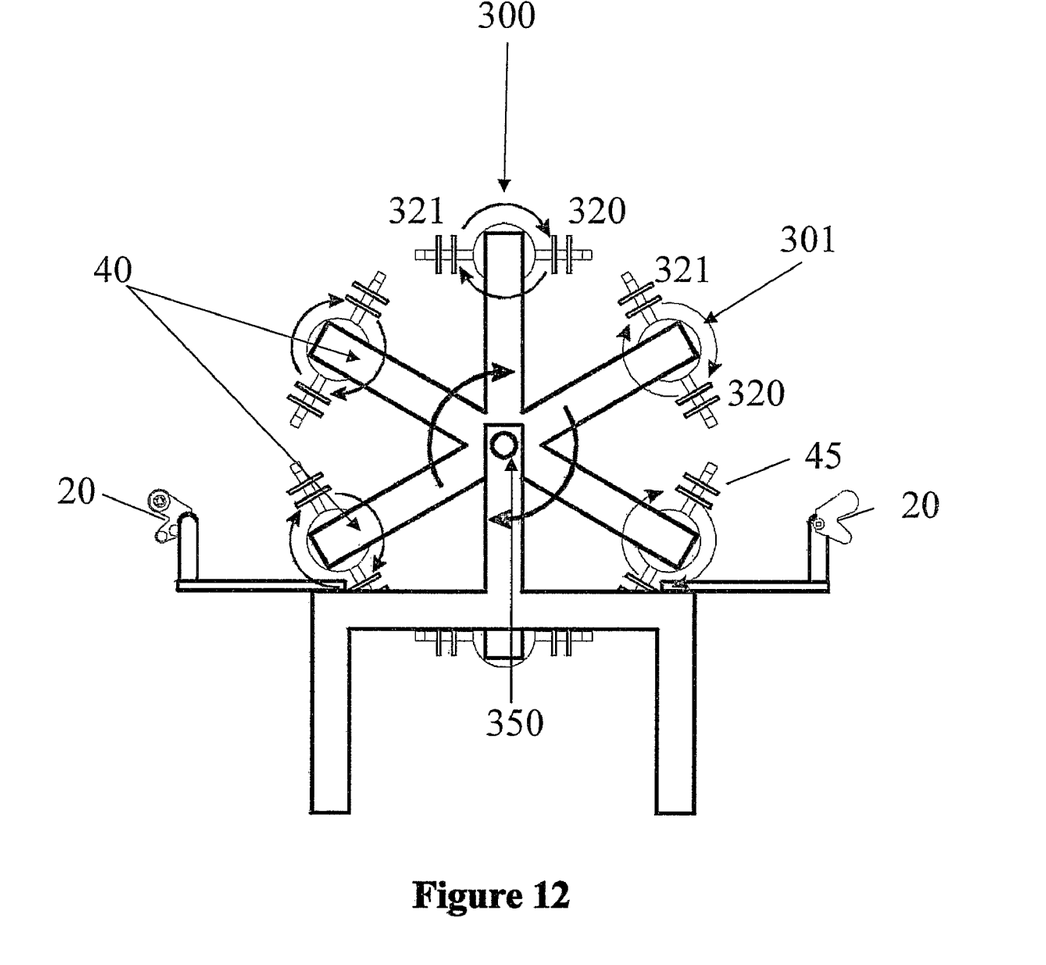
FIG. 12 is an end view of the third embodiment after the cylinder rotation is complete.

FIG. 11 and FIG. 12 show end views of the same embodiment, wherein central driving mechanism 45 rotates arms 40, which rotate on center axis 350, causing cylinders 300, 301 to rotate. At the same time, each cylinder 300, 301 is able to rotate, allowing each of the pairs of tracks 320, 321 that are mounted on cylinders 300, 301 to rotate also.

The main objective of each of the three embodiments as described above is to enable the profile wrapping machine operator to set up a plurality of distinct profile tracks—four according to the first embodiment, eight according to the second, and twenty four according to the third. These embodiments also facilitate the set up procedure since performing a 90 degree rotation of cylinder 100, 200, 300 places track 120, 220, 320 in a perpendicular position in front of the machine operator, and allow easy access to the adjustment pins.

As shown in FIG. 4, glue delivery device 20 in the second embodiment may be positioned on bridge 36. Glue delivery device 20 should then be set up and adjusted to operate on each of the tracks that are on top. This solution also ensures that glue delivery device 20 does not get in the way when a cylinder 200 is rotated, because glue delivery device 20 may then be placed above the other cylinder 200 and clear the way for the rotation.

Other embodiments may include machines that comprise additional cylinders and tracks. The glue delivery device apparatus may also vary in other embodiments of the present invention.

While the above description contains many specifics, these should not be construed as limitations on the scope of the invention, but rather as exemplifications of the preferred embodiments. Those skilled in the art will envision other possible variations that are within the scope of the invention. Accordingly, the scope of the invention should be determined not by the embodiment illustrated, but by the appended claims and their legal equivalents.

What is claimed is:

1. A profile wrapping machine comprising:
a central cylinder connected to a machine frame via an axis;
two profile tracks, comprising wheels, one on each side of the cylinder; and
a single driving means, located inside the cylinder and arranged to operate the wheels of both tracks, and
a single glue delivery device set up and adjusted for each profile track individually,
wherein the profile wrapping machine is arranged to wrap a given profile on a corresponding profile track with glue from the glue delivery device, and
wherein each profile track setup is arranged to fit a corresponding specified profile configuration;
wherein the two profile tracks are positioned in a single plain and having a common central cylinder;
wherein each profile track is operable both on its top and on its bottom, and wherein each profile track is arranged to be turnable in 180° such as to allow profile wrapping on both it top and on its bottom.

2. A profile wrapping machine comprising:
a central cylinder connected to a machine frame via an axis;
at least two secondary cylinders connected to the central cylinder;
a plurality of profile tracks, comprising wheels, a pair of each of the plurality of profile tracks associated with one of the at least two secondary cylinders with one on each side of the secondary cylinder;

a single driving means, located inside the central cylinder and arranged to operate the wheels of both tracks;

at least one glue delivery device set up and adjusted for each profile track individually;

wherein the profile wrapping machine is arranged to wrap a given profile on a corresponding profile track with glue from the glue delivery device, wherein each profile track setup is arranged to fit a corresponding specified profile configuration, wherein the secondary cylinders have a uniform angular distribution around the central cylinder, wherein each profile track is operable both on its top and on its bottom, and wherein each profile track is arranged to be turnable in 180° such as to allow profile wrapping on both its top and on its bottom.

3. The profile wrapping machine of claim 2, wherein the central cylinder is arranged to be rotatable by a specified angle such as to allow wrapping each profile by at least one of the profile tracks.

4. The profile wrapping machine of claim 3, comprising four secondary cylinders and wherein the specified angle is 90°.

5. The profile wrapping machine of claim 3, comprising six secondary cylinders and wherein the specified angle is 60°.

6. The profile wrapping machine of claim 3, wherein the single glue delivery device is arranged to be rotatable in respect to the central cylinder such as to be operable on a specified one of the profile tracks.

* * * * *